(12) United States Patent
Imaizumi et al.

(10) Patent No.: US 6,633,406 B1
(45) Date of Patent: Oct. 14, 2003

(54) IMAGE PROCESSING APPARATUS AND IMAGE FORMING APPARATUS WHICH RECOGNIZE ORIENTATION OF DOCUMENT IMAGE

(75) Inventors: Shoji Imaizumi, Shinshiro (JP); Kazuhiro Ueda, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/363,006

(22) Filed: Jul. 30, 1999

(30) Foreign Application Priority Data

Jul. 31, 1998 (JP) .......................................... 10-216694

(51) Int. Cl.[7] .............................................. G06F 15/00
(52) U.S. Cl. ...................... 358/1.18; 358/1.9; 358/1.12; 358/488; 382/289
(58) Field of Search ................................. 358/1.18, 1.9, 358/1.11, 1.12, 462, 488, 428, 461; 382/289, 290, 254, 176

(56) References Cited

U.S. PATENT DOCUMENTS

| | | | | | |
|---|---|---|---|---|---|
| 5,568,571 A | * | 10/1996 | Willis et al. | ................. | 382/254 |
| 5,572,337 A | * | 11/1996 | Kajitani et al. | ............. | 358/461 |
| 5,649,033 A | * | 7/1997 | Morikawa et al. | .......... | 382/297 |
| 5,828,467 A | * | 10/1998 | Suzuki | ........................ | 358/428 |
| 6,072,941 A | * | 6/2000 | Suzuki et al. | ................. | 358/1.9 |
| 6,173,088 B1 | * | 1/2001 | Koh et al. | ................... | 382/289 |
| 6,295,385 B1 | * | 9/2001 | Takaoka et al. | ............ | 382/289 |

FOREIGN PATENT DOCUMENTS

| | | |
|---|---|---|
| JP | 60126769 | 7/1985 |
| JP | 4-229763 | 8/1992 |
| JP | 6-103410 | 4/1994 |
| JP | 7-65120 | 3/1995 |
| JP | 9-9040 | 1/1997 |
| JP | 09069136 | 3/1997 |
| JP | 09083691 | 3/1997 |

* cited by examiner

Primary Examiner—Mark Wallerson
Assistant Examiner—Twyler M. Lamb
(74) Attorney, Agent, or Firm—McDermott, Will & Emery (57) ABSTRACT

An image processing apparatus is provided with a binarization processing unit separately from a pseudo gradation processing unit that binarizes image data of a document image according to an error diffusion method. The binarization processing unit binarizes the image data of the document image using a threshold that is set higher than a threshold used by the pseudo gradation processing unit, with each threshold representing a different predetermined density level. Histograms showing the density distribution of the document image are generated from the image data binarized by the binarization processing unit. The orientation of the document image is recognized by the histograms.

18 Claims, 9 Drawing Sheets

IMAGE AFTER ERROR
DIFFUSION PROCESSING

IMAGE AFTER SIMPLE
BINARIZATION PROCESSING

FIG. 5A filter size 3×3

25DPI isolated dot is eliminated

FIG. 5B filter size 5×5

25DPI isolated dot is eliminated

FIG. 6A document having characters of 8 point

| | | | | | |
|---|---|---|---|---|---|
| 1 | 資産の部 | | | | |
| | | 86 | 90 | 94 | 100 99 |
| 2 | 負債の部 | | | | |
| | | 2 | 6 | 8 | 4 3 |
| 3 | 資本の部 | | | | |
| | | 84 | 84 | 86 | ■ 96 96 | noise

FIG. 6B document having characters of 18 point

3年連続増収増益 noise

IMAGE PROCESSING APPARATUS AND IMAGE FORMING APPARATUS WHICH RECOGNIZE ORIENTATION OF DOCUMENT IMAGE

This application is based on an application No. 10-216694 filed in Japan, the content of which is hereby incorporated by reference.

BACKGROUND OF THE INVENTION (1) Field of the Invention

The present invention relates to improvements in a technique of recognizing the orientation of a document image using an image forming apparatus such as a copier.

(2) Related Art

For making copies of documents, a user may use an automatic document feeder (ADF). In this case, when the user sets documents arranged in random orientations, i.e. the documents include pages that are upside down, the orientations of images formed on discharged recording sheets are also random in the same way as the documents having set by the user. Hereinafter, the recording sheets on which images have been formed are referred to as the "copied sheets."

To align the orientations of images formed on copied sheets, the user has to check the documents one by one and arrange the documents in the same orientation before setting the documents on the ADF.

However, this checking job causes great inconvenience. When making copies of a great number of documents, the user is likely to miss pages that are upside down. Due to imperfect checking, the user has to arrange the copied sheets in the same orientation again after the copying operations. When making copies of documents using a sort function, the user has to do this checking job after the copying operations for each copy stack. This takes much time and effort.

To address this problem, various methods have been suggested for recognizing the orientation of a document image and performing image rotation processing when necessary so that the image formed on a recording sheet is the right way up. Hereinafter, the processing for recognizing the orientation of a document image is referred to as the "orientation detection processing."

As one example of the orientation detecting method, the orientation of a document image is recognized by distribution of characters in the document image. This method is explained in detail below.

First, histograms of the main scanning and sub-scanning directions are generated from the document image data on which binarization processing has been performed according to, for example, the error diffusion method. Note that the binarization processing is performed in normal image processing. The generation of the histograms is achieved by adding up black pixels of the document image in the main scanning and sub-scanning directions respectively.

Distributions displayed by the two histograms of the main scanning and sub-scanning directions are used to recognize the orientation of the document image. More specifically, in one histogram, apart with a zero frequency and apart with anon-zero frequency may alternate. The parts with zero frequencies are spaced uniformly, and the parts with non-zero frequencies are also spaced uniformly. Here, a part with a zero frequency can be considered to correspond to a space between character lines of the document. From this distribution, the direction in which the characters are written is judged to be the main scanning or sub-scanning direction.

Hereinafter, the direction in which characters are written (i.e. the main scanning or sub-scanning direction) is referred to as the "line direction" of the document.

After the line direction of the document is detected, the beginning of a character line is next detected using the other histogram. Here, it should be noted that although the English language is basically written horizontally, the Japanese language is written both horizontally and vertically. Also note that when the Japanese script is written vertically, it is written from right to left. When characters are written horizontally from left to right in English, for example, the beginning of each character line is on the left of the document. Meanwhile, when characters are written vertically in Japanese, for example, the beginning of each character line is at the top of the document. In this specification, regardless of whether characters are written horizontally or vertically, the beginning and end of each character line are respectively referred to as the "beginning of lines" and "end of lines."

Although the beginnings of lines are almost aligned on the document, ends of lines are not aligned. As such, the other histogram displays the distribution where frequencies gradually decrease from one end to the other end, with the ends respectively corresponding to the beginnings and ends of lines. From this distribution, the beginning of lines of the document can be detected.

In this way, the line direction and the beginning of lines are detected and, as a result, the starting position of the document image at which the user starts reading the document is detected. This enables the orientation of the document image to be recognized.

Using this conventional method, however, a problem occurs when the background of a document image is inconsistent in the density or a document image includes a picture or the like. In this case, the precision of the orientation detection processing is deteriorated. More specifically, the background that is inconsistent in the density and the picture included in the document image may be reproduced in black pixels through the stated binarization processing. These black pixels are also counted together with the black pixels corresponding to the characters of the document for generating the histograms. Thus, the histogram, from which the line direction of the document is to be detected, will not display the stated distribution. Specifically, a part with a zero frequency and a part with a non-zero frequency alternate, with the parts with zero frequencies being spaced uniformly and the parts with non-zero frequencies being spaced uniformly.

SUMMARY OF THE INVENTION

The first object of the present invention is to provide an image processing apparatus that can recognize the orientation of a document image with a high degree of precision regardless of document types.

The second object of the present invention is to provide an image forming apparatus that can recognize the orientation of a document image with a high degree of precision regardless of document types.

The first object of the present invention can be achieved by an image processing apparatus made up of: a pseudo gradation process on image data of a document image according to a pseudo halftone reproduction method; an N-value processing unit which generates N-value image data ($N \geq 2$) using the image data of the document image; and a recognition controller which recognizes an orientation of the document image using the N-value image data generated by the N-value processing unit.

With this construction, the image data of the document image is converted into the N-value image data independently of the conversion performed by the pseudo gradation processing unit that performs the pseudo gradation process on the image data of the document image according to the pseudo halftone reproduction method. Using the N-value image data, the orientation of the document image is recognized. The image data on which the pseudo gradation processing unit has performed the pseudo gradation process includes the halftone image information as well as character image information. Thus, when the orientation of the document image is recognized using this image data, there would be a high probability of incorrect recognition. By means of the present invention, the N-value processing unit is provided separately from the pseudo gradation processing unit. The N-value processing unit can generate the N-value image data so that the halftone image information is included as less as possible. As a result, the orientation of the document image can be recognized using the N-value image data with a high degree of precision.

The first object of the present invention can be also achieved by an image processing apparatus made up of: a receiving unit which receives image data of a document image; a first binarizing circuit which binarizes the image data received by the receiving unit to generate first binarized image data, according to a first method; an image processing circuit which performs an image process on the first binarized image data; a second binarizing circuit which binarizes the image data received by the receiving unit to generate second binarized image data, according to a second method that is different from the first method; and a recognition controller which recognizes an orientation of the document image using the second binarized image data.

With this construction, the image data of the document image is binarized independently of the binarization performed on the image data for the image process by the first binarizing circuit. Using the independently binarized image data, the orientation of the document image is recognized. The image data on which the binarization has been performed for the image process by the first binarizing circuit includes the halftone image information as well as character image information. Thus, when the orientation of the document image is recognized using this binarized image data, there would be a high probability of incorrect recognition. By means of the present invention, the second binarizing circuit is provided separately from the first binarizing circuit. The second binarizing circuit can generate the binarized image data to be used for recognizing the orientation of the document image so that the halftone image information is included as less as possible. As a result, the orientation of the document image can be recognized using the binarized image data with a high degree of precision.

The second object of the present invention can be achieved by an image forming apparatus made up of: a receiving unit which receives image data of a document image; a pseudo gradation processing unit which performs a pseudo gradation process on the image data received by the receiving unit according to a pseudo halftone reproduction method; an image forming unit which reproduces the document image using the image data on which the pseudo gradation processing unit has performed the pseudo gradation process; an N-value processing unit which converts the image data received by the receiving unit into N-value image data ($N \geq 2$) expressed by N-level of values; and a recognition controller which recognizes an orientation of the document image using the N-value image data generated by the N-value processing unit.

With this construction, the image data of the document image is converted into the N-value image data independently of the conversion performed by the pseudo gradation processing unit that performs the pseudo gradation process on the image data to reproduce the document image. Using the N-value image data, the orientation of the document image is recognized. The image data on which the pseudo gradation processing unit has performed the pseudo gradation process includes the halftone image information as well as character image information. Thus, when the orientation of the document image is recognized using this image data, there would be a high probability of incorrect recognition. By means of the present invention, the N-value processing unit is provided separately from the pseudo gradation processing unit. The N-value processing unit can generate the N-value image data so that the halftone image information is included as less as possible. As a result, the orientation of the document image can be recognized using the N-value image data with a high degree of precision.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF PREFERRED EMBODIMENT

The following is a description of an embodiment of the image processing apparatus of the present invention. In the embodiment, the image processing apparatus is provided in a digital monochrome copier (simply referred to as the "copier" hereinafter).

1. Construction of the Copier

Figure 1:
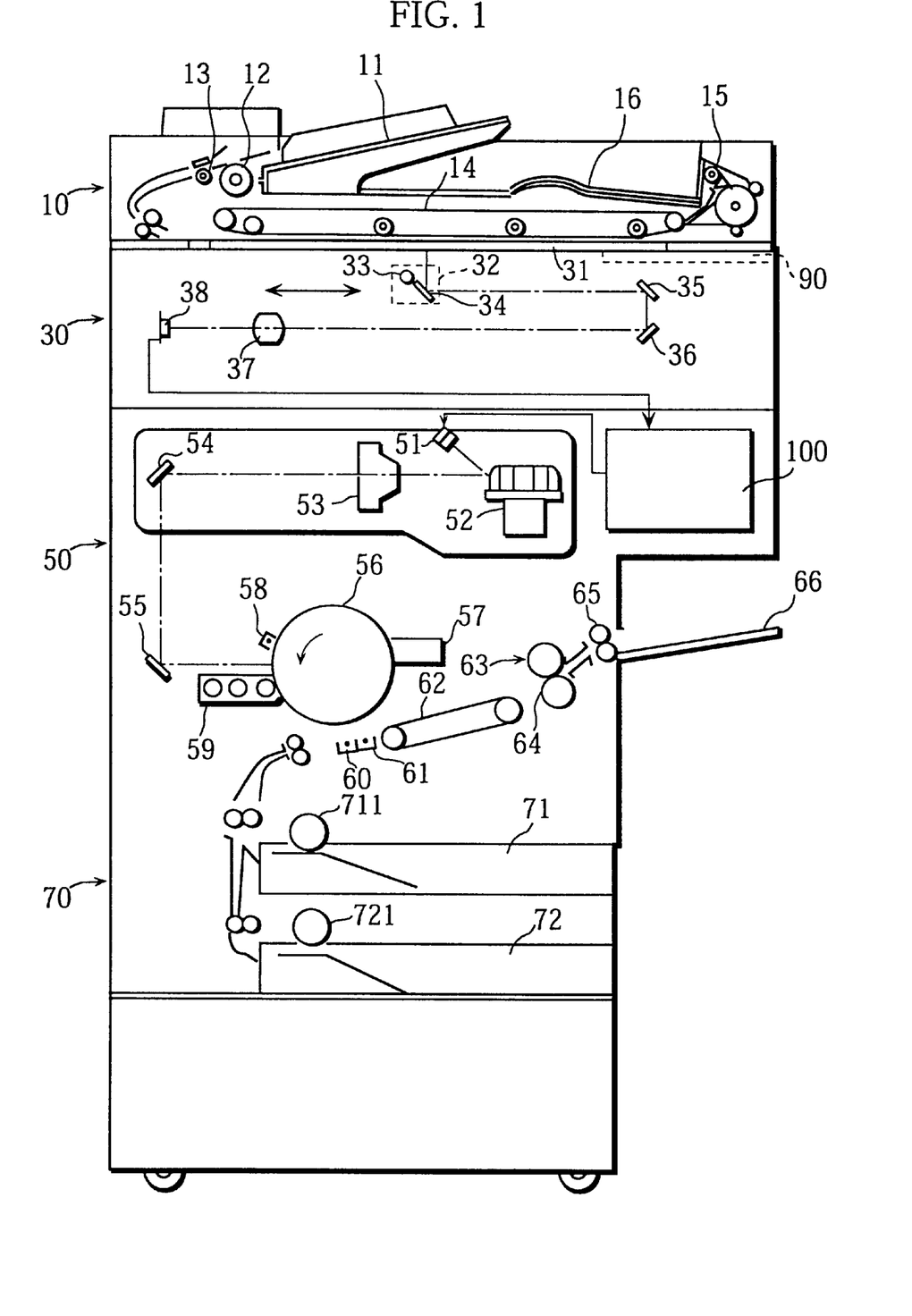
FIG. 1 shows a schematic overall construction of a digital copier of an embodiment of the present invention.

The overall construction of the copier is described, with reference to FIG. 1. As shown in FIG. 1, the copier is composed of an ADF 10, an image reading unit 30, a printing unit 50, and a paper supplying unit 70.

The ADF 10 automatically transports documents one by one to the image reading unit 30. The documents placed on a document tray 11 are transported downward one at a time by a paper feeding roller 12 and a take-up roller 13. The document is then transported to a document reading position of a platen glass 31 by a transport belt 14.

The document transported to the document reading position is scanned by the scanner 32 provided in the image reading unit 30. After this, the document is transported to the right (as the copier is viewed in FIG. 1) by the transport belt 14 and discharged onto a discharge tray 16 via a discharge roller 15.

The image reading unit 30 includes a scanner 32 and a CCD image sensor (referred to as the "CCD") 38, and optically reads a document image transported to the document reading position of the platen glass 31 using the scanner 32 and the CCD 38.

The scanner 32 is provided with an exposure lamp 33 and a mirror 34. A light emitted by the exposure lamp 33 is reflected off the document, and the mirror 34 redirects the light so that the light path is parallel to the platen glass 31. The scanner 32 laterally moves as indicated by the arrow in FIG. 1 to scan the document set on the platen glass 31. After being reflected off the document and redirected by the mirror 34, the light is guided to the CCD 38 via mirrors 35 and 36 and a converging lens 37. The CCD 38 converts the light into electric signals and so generates image data. Note that the resolution of the CCD 38 is 400 dpi.

Figure 2:
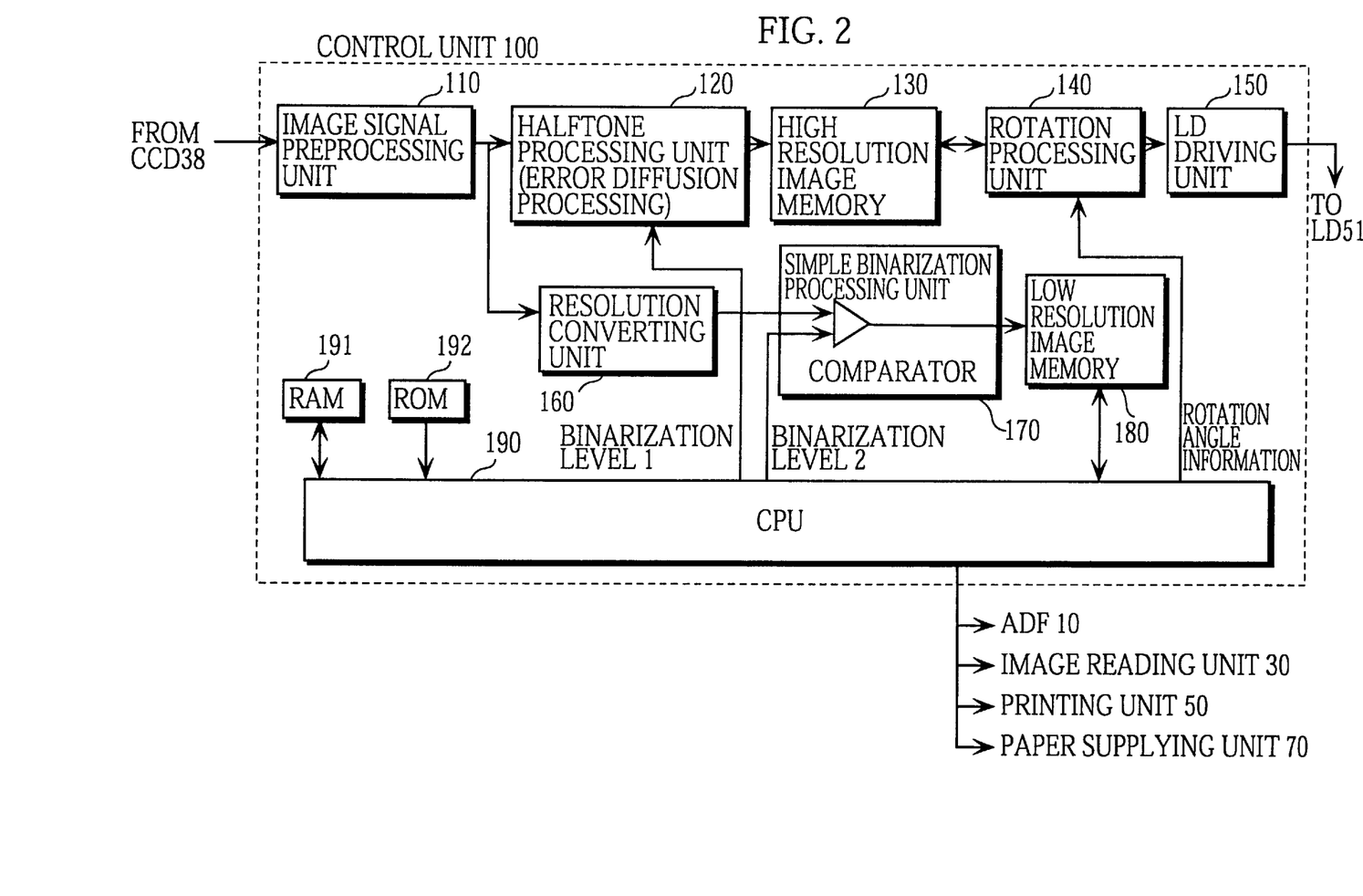
FIG. 2 is a block diagram showing the construction of a control unit of the digital copier.

The image data is converted into digital signals through the A/D conversion performed by an image signal preprocessing unit 110 included in a control unit 100 shown in FIG. 2. After various correction processes, such as a shading correction process and a density conversion process, are performed on the image data, the image data is transmitted to a halftone processing unit 120. The halftone processing unit 120 performs well-known error diffusion processing on the image data, and the image data is then stored in a high resolution image memory 130 shown in FIG. 2. In accordance with the result of the orientation detection processing performed in a CPU 190 as described later in this specification, rotation processing is performed on the image data stored in the high resolution image memory 130. Then, the image data becomes a driving signal of a laser diode (referred to as the "LD" hereinafter) 51 of the printing unit 50.

The printing unit 50 forms an image on a recording sheet according to the well-known electrophotographic method. Receiving the driving signal, the printing unit 50 activates the LD 51, which then emits a laser beam. The laser beam is reflected off a facet of a polygon mirror 52 that is rotating at a predetermined angular speed, and scans a surface of a photosensitive drum 56 via an fθ lens 53 and mirrors 54 and 55.

Before this scanning process performed on the photosensitive drum 56, a cleaning unit 57 removes remaining toner particles from the surface of the photosensitive drum 56. Also, an eraser lamp (not shown) neutralizes any surface potential remaining on the surface of the photosensitive drum 56. The surface of the photosensitive drum 56 is then uniformly charged by a sensitizing charger 58. In this charged state, the laser beam scans the surface of the photosensitive drum 56, so that an electrostatic latent image is formed on the surface of the photosensitive drum 56.

A developing unit 59 develops the electrostatic latent image formed on the surface of the photosensitive drum 56 into a visible toner image.

The paper supplying unit 70 includes paper cassettes 71 and 72 as shown in FIG. 1. In synchronization with the stated exposure and development operations performed on the photosensitive drum 56, a recording sheet of a required size is fed by a feeding roller 711 or 721 from the corresponding paper cassette 71 or 72. The recording sheet comes in contact with the surface of the photosensitive drum 56 at the bottom of the photosensitive drum 56. By means of static electricity of the transfer charger 60, the toner image formed on the surface of the photosensitive drum 56 is transferred onto the recording sheet.

After this, the recording sheet is separated from the surface of the photosensitive drum 56 by static electricity of a separation charger 61, and is transported to a fixing unit 63 by a transport belt 62.

The toner image transferred onto the recording sheet is fixed by the fixing unit 63 using a fixing roller 64 provided with a heater. By the application of heat from the heater, the toner particles are fused and fixed in place on the recording sheet. After this, the recording sheet is discharged onto a discharge tray 66 by a discharge roller 65.

An operation panel 90 is provided at an optimum position on the top of the image reading unit 30. The operation panel 90 is provided with a numeric keypad for inputting the number of copies to make, a copy start key for indicating copy start, setting keys for setting various copy modes, and a display unit for displaying a mode that was set through the corresponding setting key.

2. Construction of the Control Unit 100

The construction of the control unit 100 is described with reference to the block diagram shown in FIG. 2.

As shown in FIG. 2, the control unit 100 includes an image signal preprocessing unit 110, a halftone processing unit 120, a high resolution image memory 130, a rotation processing unit 140, an LD driving unit 150, a resolution converting unit 160, a simple binarization processing unit 170, a low resolution image memory 180, a CPU 190, a RAM 191, and a ROM 192.

The image signal preprocessing unit 110 includes an A/D converter, a shading correction unit, and an MTF correction unit, and a γ correction unit. The document image data inputted with the resolution of 400 dpi is converted into digital multivalued signals by the A/D converter. For example, the document image data may be converted into data values corresponding to 256 (from 0 to 255) gradation levels. Then, the shading correction unit corrects variations in sensitivity of the CCD 38. Following this, the MTF correction unit performs processes, such as an edge enhancement process, for improving the image quality. Also, the γ correction unit performs a γcorrection process. After this, the image data is transmitted to the halftone processing unit 120 and the resolution converting unit 160.

The halftone processing unit 120 performs gradation reproduction processing according to a pseudo halftone reproducing method so as to faithfully reproduce a document image which includes a halftone image that can be found in a picture or the like. In the present embodiment, the halftone processing unit 120 employs the well-known error diffusion method.

The image data transmitted from the image signal preprocessing unit 110 is binarized through the error diffusion processing. In this processing, each data value of pixels of the image data is compared with a "binarization level 1" used as a threshold. Here, the binarization level 1 is set by the CPU 190. In the present embodiment, the binarization level 1is set at "64". Specifically, when a data value of a pixel after the error diffusion processing exceeds "64", the data value is converted into "255", that is, the pixel is converted into a black pixel. When a data value of a pixel after the error diffusion processing is equal to or below "64", the data value is converted into "0", that is, the pixel is converted into a white pixel. The image data binarized in this way is stored in the high resolution image memory 130 for each page.

Figure 3A:
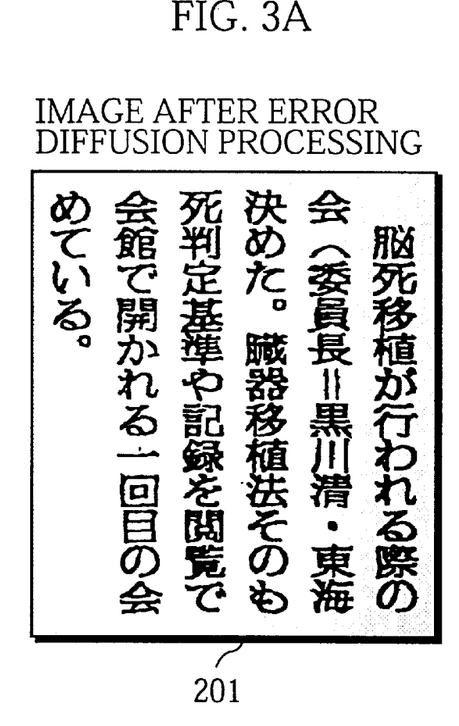
FIG. 3A shows a case where a halftone processing unit has binarized image data of a document that has characters printed on a halftone background.

FIG. 3A shows an image 201 as one example where the halftone processing unit 120 has binarized image data of an image from a newspaper. For information, the image 201 is from a Japanese newspaper and the characters (forming two sentences in this case) of the image 201 are written vertically with the first sentence starting from the top right-hand corner of the image 201. In general, the background of a newspaper is halftone. When the halftone processing unit 120 binarizes image data of a document having a halftone background, black dots (or, black pixels) are diffused in parts that correspond to the halftone background while they are dense in parts that correspond to the characters as shown in FIG. 3A. The human eye perceives diffused dots as halftone and dense dots as black.

When image data of an area that is inconsistent in the density is binarized by the halftone processing unit 120, a reproduced image associated with this area will have black pixels diffused in such a manner that the black pixels correspond to dark parts of the area. The manner of diffusion depends on the binarization level 1 that is used as the threshold in the binarization processing performed after the error diffusion processing. More specifically, when the binarization level 1 is set low, the number of pixels to be converted into black pixels (data value=255) is increased. When the binarization level 1 is set high, the number is reduced. The error diffusion processing is performed with the aim of reproducing a document image faithfully. Thus, the binarization level 1 should not be set too low or too high. If the binarization level 1 is too low, the image is reproduced darker than its original image. If the binarization level 1 is too high, the image is reproduced lighter or, the reproduced image looks bleached as compared with its original image. The binarization level 1 used as the threshold is determined from empirical facts in a large measure. Generally, it is set at a little lower than the middle of 256 levels.

On receiving an instruction from the CPU 190, the rotation processing unit 140 shown in FIG. 2 sequentially reads the image data associated with a target page from the high resolution image memory 130, and performs the rotation processing on the read image data when necessary in accordance with a result obtained by the orientation detection processing described later in this specification. After this, the rotation processing unit 140 transmits the image data to the LD driving unit 150. It should be noted here that the rotation processing is performed according to the well-known technique of changing the address of the image data. This technique is disclosed in the Japanese Laid-Open Patent Application No. S60-126769, for example.

The LD driving unit 150 generates a driving signal from the image data outputted from the rotation processing unit 140 and transmits the driving signal to the LD 51.

Meanwhile, the resolution converting unit 160 converts the image data with 400 dpi outputted from the image signal preprocessing unit 110 into the image data with 25 dpi. This resolution conversion is performed as follows using the well-known technique.

The image data with 400 dpi is first divided into blocks that each are a 16- by 16-pixel matrix (16 consecutive pixels are arranged in the main scanning and sub-scanning directions respectively), so that each block is composed of 256 pixels. Then, out of the 256 pixels, a pixel having the greatest density value is obtained and that greatest density value is set as the density of the block. In this way, the block is treated as a new pixel, and the resolution is reduced to $1/16$. This resolution conversion is executed for each block of the image data. As a result, the image data with 400 dpi is converted into the image data with 25 dpi.

The resolution is changed from high to low for the following reasons. For the orientation detection processing (described later) performed on the basis of the histograms, the resolution of the image data does not need to be high and only distribution information of characters of a document, i.e. the information how characters are distributed on a document, is required. This information is referred to as the "character distribution information" hereinafter. Also, the resolution is changed from high to low for the purpose of reducing the amount of data, so that next processing can be executed smoothly at a high speed. In addition, an inexpensive memory can be used for storing the reduced amount of data, thereby reducing manufacturing costs.

The simple binarization processing unit 170 binarizes the image data with 25 dpi which has been processed in the resolution converting unit 160 and stores the binarized image data into the low resolution image memory 180. The simple binarization processing unit 170 is provided with a comparator. Using the comparator, the simple binarization processing unit 170 compares each data value of pixels of the 25 dpi image data with a "binarization level 2" used as a threshold. When the data value exceeds the binarization level 2, the data value is changed to "255" and the pixel is converted into a black pixel. When the data value is equal to or below the binarization level 2, the data value is changed to "0" and the pixel is converted into a white pixel. The image data with 25 dpi is binarized in this way, and is stored into the low resolution image memory 180.

The binarization level 2 is set by the CPU 190 as is the case of the binarization level 1. In the present embodiment, the binarization level 2 is set at "200". The binarization level 2 is set considerably higher than the binarization level 1 which is set at "64" in the present embodiment. This is because the binarization level 1 is set for the purpose of reproducing the document image as faithfully as possible while the binarization level 2 is set for the purpose of obtaining character data only that is reproduced in black. This is to say, the binarization level 2 needs to be set so that only character data, which is normally reproduced in black or dark color, is extracted and that data aside from the character data is used as less as possible for generating historgrams. It should be noted here that the value set as the binarization level 2 is not limited to "200". The binarization level 2 may be set at a value which deletes halftone images as much as possible that are not character images.

Figure 3B:
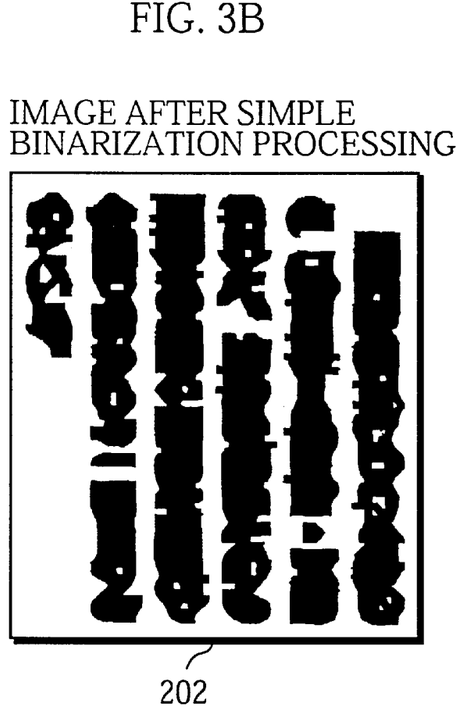
FIG. 3B shows a case where a simple binarization processing unit has binarized image data of a document that has characters printed on a halftone background.

FIG. 3B shows an image 202 as one example where the simple binarization processing unit 170 has binarized the image data of the image from the newspaper.

Out of the image data transmitted from the image signal preprocessing unit 110, the image data associated with the characters is converted into image data with low resolution by the resolution converting unit 160. As a result, line segments forming a character are broadened and few white pixels exist in a character image as shown in FIG. 3B. Also, there is hardly any clearance between the characters and they are vertically connected to each other forming solidly shaded area for each vertical character line. Meanwhile, as to the halftone background of the image where images such as characters are not printed, each data value of pixels associated with these non-image parts is determined as one of values 0 to 255 and stored immediately after the processing performed by the resolution converting unit 160. However, almost all of these data values are equal to or less than "200", so that these data values are changed to "0" by the simple binarization processing unit 170, that is, these pixels are converted into white pixels. As a result, the low resolution image memory 180 stores the image data having only the character distribution information and the character size information (character width in the present example), and other information, such as data corresponding to the halftone background, is included as less as possible.

The low resolution image memory 180 stores the binarized image data with low resolution for each page.

The RAM 191 stores document image data after the CPU 190 performs noise elimination processes 1 and 2 described later, and temporarily stores various control variables.

The ROM 192 stores programs for the document transporting operation of the ADF 10, the scanning operation of the image reading unit 30, the image forming operation of the printing unit 50, and the image data rotating operation of the rotation processing unit 140. In addition to these programs, the ROM 192 stores the values set as the binarization levels 1 and 2 which are used in the stated binarization processing and a value related to an isolated dot judging condition described later.

The CPU 190 reads the necessary programs from the ROM 192 to set the values of the binarization levels 1 and 2, set an inverse flag when necessary, and read the image data with low resolution from the low resolution image memory 180 for each page to perform the noise elimination process 1 or 2 (described later) on the read image data. After this, the CPU 190 stores the image data into the RAM 191 for each page and generates histograms from the image data for each page. The CPU 190 recognizes the orientation of the document image by the histograms, and transmits a rotation angle signal to the rotation processing unit 140 so that the reproduced image will be the right way up. Then, the CPU 190 controls processing timings of the ADF 10, the image reading unit 30, and the printing unit 50 so that the copying operation will be smoothly executed.

Both the generation of histograms and the orientation detection based on the histograms are realized according to the well-known techniques as disclosed in Japanese Laid-Open Patent Application No. H09-9040, for example. Therefore, the detailed explanations of the generation of histograms and the orientation detection are omitted in this specification, and the techniques are briefly explained below.

Figure 7A:
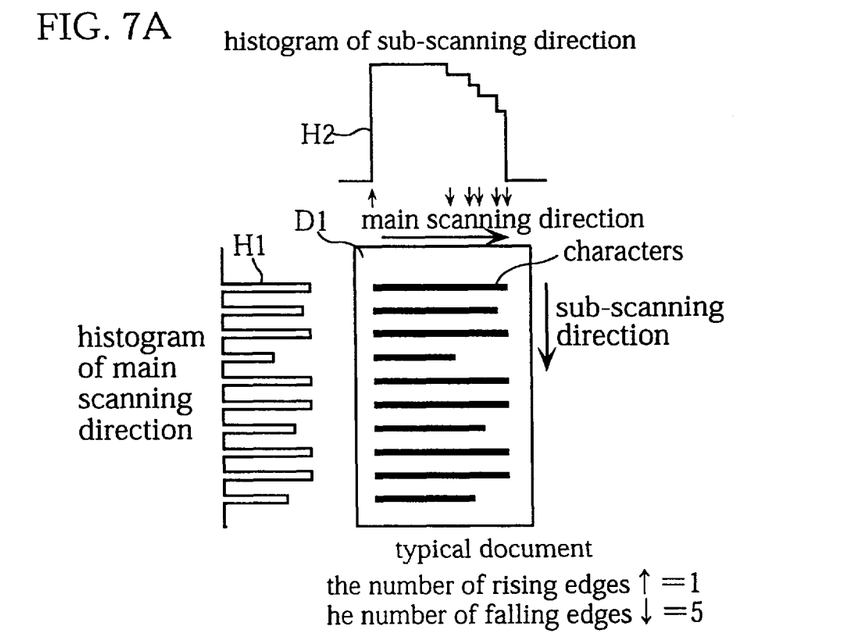
FIG. 7A shows an example of a histogram generated from image data of a typical document.

The brief explanation is given using a document D1 shown in FIG. 7A as an example. The document D1 has characters printed on a white background. Hereinafter, such black-on-white documents are referred to as the "typical documents." From the image data stored in the low resolution image memory 180, the CPU 190 generates a histogram Hi by counting black pixels in the main scanning direction and a histogram H2 by counting black pixels in the sub-scanning direction. As described above, a histogram in which a part with a low frequency (or, zero frequency) and a part with a high frequency (or, non-zero frequency) alternate indicates the line direction of the document, with the part with a low frequency corresponding to a space between character lines. In this example, the line direction of the document D1 is judged to be the main scanning direction from the histogram H1.

Then, the beginning of lines is judged from the histogram H2. As explained in the "Related Art" of the present specification, the beginning of lines is detected from the distribution displayed by the corresponding histogram. More specifically, it is judged from the number of edges of the histogram, and at each edge the present frequency is remarkably increased or decreased from the previous frequency. An edge point where its frequency is remarkably increased from the previous frequency is referred to as the "rising edge" and an edge point where its frequency is remarkably decreased from the previous frequency is referred to as the "falling edge." The number of rising edges and the number of falling edges are separately counted. For example, for the histogram H2, the numbers of rising edges and falling edges are counted from left to right. Hereinafter, the direction in which the edges are counted is referred to as the "counting direction." When the number of falling edges is greater than the number of rising edges, that histogram is judged to display the distribution where the frequencies are gradually decreasing in the counting direction. On the other hand, when the number of rising edges is greater than the number of falling edges, that histogram is judged to display the distribution where the frequencies are gradually increasing in the counting direction.

In the histogram H2, for example, the number of rising edges is one and the number of falling edges is five, meaning that the number of falling edges is greater than the number of rising edges. As a result, the histogram H2 is judged to display the distribution where the frequencies are gradually decreasing in the counting direction, i.e. from left to right. Thus, the beginning of lines of the document D1 is judged to be on the left (as the document D1 is viewed in FIG. 7A).

Accordingly, from the line direction and the beginning of lines detected in the stated way, the starting position of the document D1 is judged to be on the upper left-hand corner of the document D1. The detection of the starting position of the document D1 enables the orientation of the document D1 to be recognized.

Figure 4:
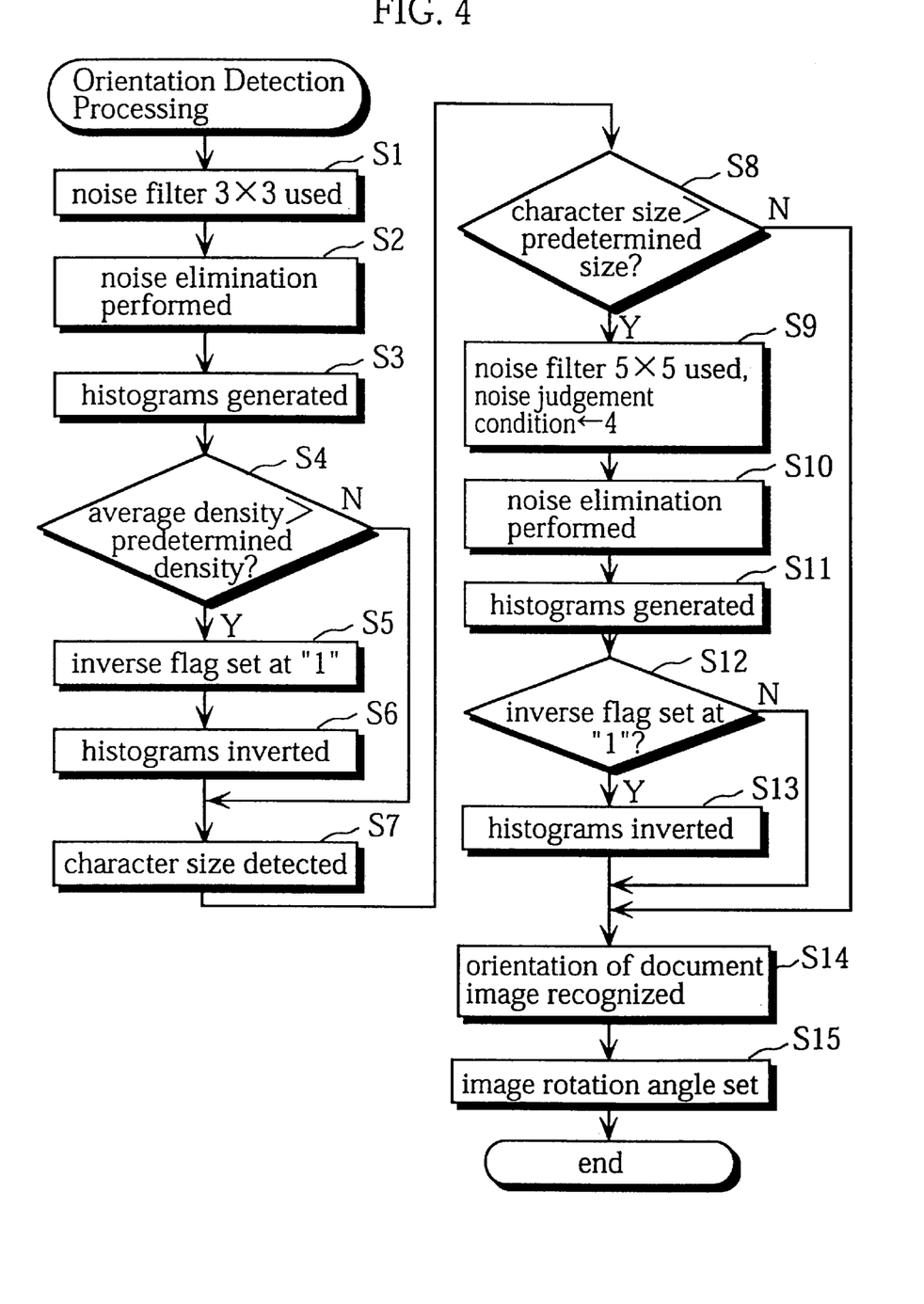
FIG. 4 is a flowchart showing the orientation detection processing.

The following is a description of the orientation detection processing that includes preprocessing for the histogram generation, with reference to the flowchart shown in FIG. 4.

The CPU 190 judges whether isolated dots existing in the image data stored in the low resolution image memory 180 are noises such as stains, and eliminates the isolated dots that have been judged as noises using a noise eliminating filter 3×3 (referred to as the filter 3×3) in the noise elimination process 1 (steps S1 and S2). After the noise elimination, the CPU 190 stores the image data into the RAM 191. From the image data stored in the RAM 191, the CPU 190 generates histograms displaying the character distribution of the document (step S3). The CPU 190 next obtains the average density of the document using the histograms and judges whether the obtained average density exceeds a predetermined density (step S4). If so ("Y" in step S4), the CPU 190 sets the inverse flag at "1" (step S5) and inverts the histograms as described later (step S6).

The CPU 190 detects the character size from the histograms (step S7) and judges whether the detected character size is larger than a predetermined size (step S8). If so ("Y" in step S8), the CPU 190 switches the noise eliminating filter 3×3 to a noise eliminating filter 5×5 (referred to as the filter 5×5) and eliminates the noises existing in the image data stored in the low resolution image memory 180 using the filter 5×5 (steps S9 and S10). After the noise elimination, the image data is stored in the RAM 191. The CPU 190 generates histograms again according to the same process performed in step S3 (step S11). Then, the CPU 190 judges whether the inverse flag is set at "1" (step S12). If so ("Y" in step S12), the CPU 190 inverts the histograms generated in step S11 according to the same process performed in step S6 (step S13). If the inverse flag is judged to be set at "0" ("N" in step S12), the CPU 190 proceeds to step S14. Although not indicated in this flowchart, the inverse flag is reset to "0" every time histograms have been inverted in step S13.

Meanwhile, if the character size is equal to or smaller than the predetermined size ("N" in step S8), the CPU 190 proceeds to step S14 without executing steps S9 to S13. This is because the CPU 190 has already eliminated the noises of the image data using the filter 3×3 and generated the histograms from the image data (steps S1 to S6). This is to say, when the character size is equal to or smaller than the predetermined size, steps S9 to S13 are skipped and steps S1 to S6 are selected by the CPU 190.

The CPU 190 then recognizes the orientation of the image for each page in accordance with the histograms generated in step S3 or S11 or the histograms generated in step S6 or S13 (step S14). In accordance with the orientation result, the CPU 190 sets a rotation angle for the image data (step S15). Both the orientation detection and the rotation angle setting are performed according to the well-known techniques as disclosed in the cited Japanese Laid-Open Patent Application No. H09-9040, for example.

The following are detailed descriptions of the processes performed for orientation detection, with reference to FIGS. 5 to 8.

Noise Elimination Process 1

Figure 5A:
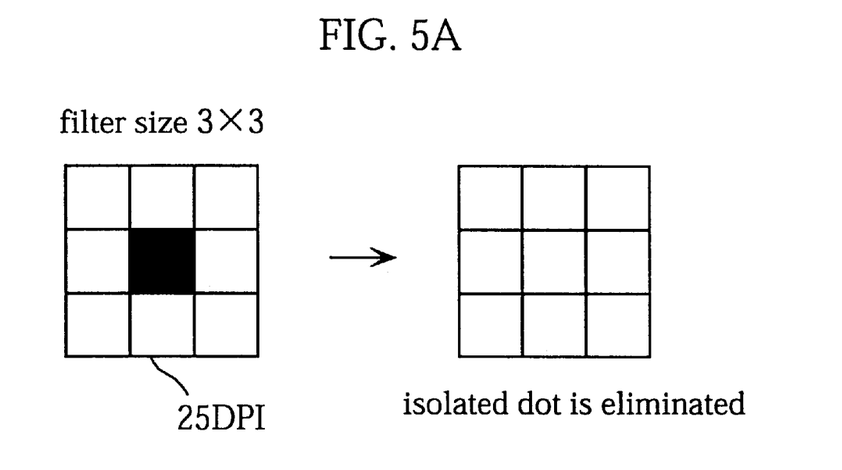
FIG. 5A shows a case where an isolated dot is eliminated using a noise eliminating filter 3×3.

FIG. 5A shows a case where an isolated dot that is judged to be a noise is eliminated using the filter 3×3 in the noise elimination process 1.

By means of the filter 3×3, when a target pixel that is to be a noise is black and pixels adjacent to the target pixel (eight pixels in this case) are white as shown in FIG. 5A, the noise is eliminated by changing the target pixel to a white pixel. In the noise elimination process 1, the filter 3×3 is moved so that each pixel will be located at the central box of the filter 3×3.

In the present embodiment, the document image data is converted into the image data with 25 dpi. Therefore, the size of a pixel is about 1 mm×1 mm. This is to say, an isolated dot of this size at the maximum can be eliminated using the filter 3×3.

Character Size Detection Process

The size of characters of a document is detected using the histogram that indicates the line direction of the document.

In FIG. 7A, for example, the character size is detected using the histogram H1. As seen from the distribution displayed by the histogram H1, crests (having non-zero frequencies) and troughs (having zero frequencies) respectively correspond to character lines and spaces between the character lines. The height of a character can be obtained by counting the number of pixels along a crest in the sub-scanning direction. As a result, the character size can be determined from the obtained character height.

Noise Elimination Process 2

When the detected character size is larger than the predetermined size, the noise elimination process 2 is performed to eliminate isolated dots that are judged as noises. In the present embodiment, the predetermined size is set at 12 point. In the noise elimination process 2, the filter to be used for eliminating the noises is switched from the filter 3×3 to the filter 5×5.

Figure 5B:
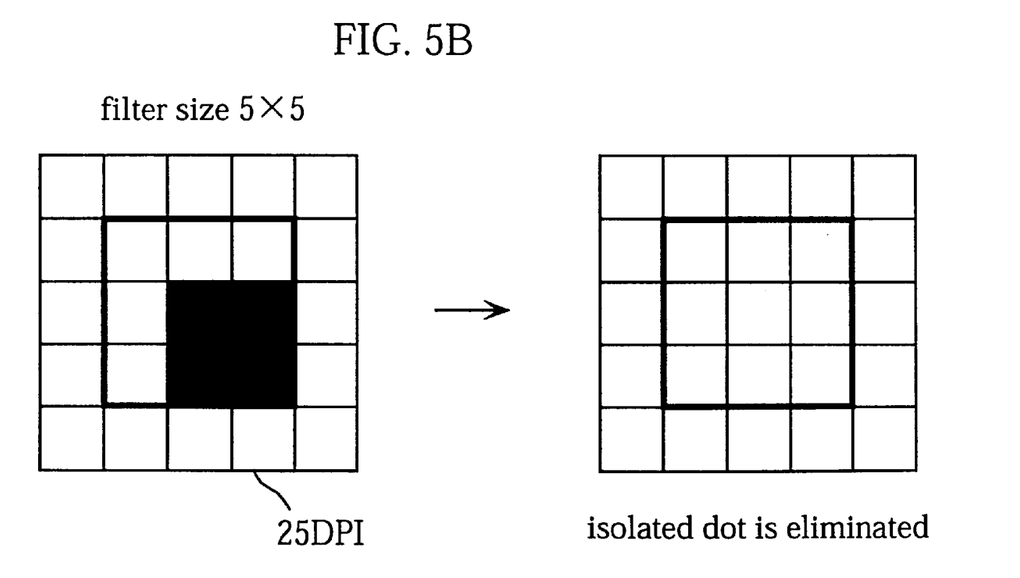
FIG. 5B shows a case where an isolated dot is eliminated using a noise eliminating filter 5×5.

FIG. 5B shows an example where an isolated dot that is judged as a noise is eliminated using the filter 5×5. Suppose that an isolated dot exists in the central 3 by 3 matrix of pixels (drawn in the thick line) of a 5 by 5 matrix of pixels, as shown in the left-hand drawing of FIG. 5B. Here, when the number of black pixels forming the isolated dot is equal to or less than a predetermined number of black pixels, the isolated dot is judged to be a noise and eliminated by the filter 5×5. In the present embodiment, the predetermined number of black pixels is set at "4" and this number is referred to as the "noise judgement condition." By means of the filter 5×5, an isolated dot that cannot be eliminated by the filter 3×3 due to its size can be eliminated. An isolated dot formed from a 2 by 2 matrix of pixels at the maximum can be eliminated by the filter 5×5.

For eliminating isolated dots existing in a document image, the filter 3×3 is used when the character size is equal to or smaller than 12 point and the filter 5×5 is used when the character size is larger than 12 point in the present embodiment. This means that either the filter 3×3 or the filter 5×5 is used, depending on the character size of the document image.

In the present embodiment, the filter is switched based on the premise that whether or not a target isolated dot is a noise depends on the character size of the document image. More specifically, when the character size is relatively large, the size of an isolated dot to be judged as a noise is also large. Surely, noises existing in a document image vary in size. The size of a noise may be almost the same as the character size, or may be as small as one pixel. However, as described above, the noise elimination process is performed for the purpose of generating the histograms substantially from the character images. Thus, all the noises existing in the document image do not need to be eliminated through complicated processing. Only isolated dots that exist away from character images need to be eliminated.

Yet, isolated dots that vary in size need to be judged whether they are really noises before they are eliminated. In the present embodiment, as described above, the character size of the document image is detected, and an isolated dot that is smaller than the character size to a certain extent is judged as a noise since such a dot is not likely to form a character image. More specifically, when the character size is 12 point or less (the character height is about 4.2 mm or less), an isolated dot the size of about ¼ of a 12 point character (the height of the isolated dot is about 1 mm) is judged as a noise and eliminated using the filter 3×3. When the character size is larger than 12 point, an isolated dot the size of a 2 mm by 2 mm matrix at the maximum is judged as a noise and eliminated using the filter 5×5. In this way, the filter used for the noise elimination is switched between the filter 3×3 and the filter 5×5 depending on the character size.

Figure 6A:
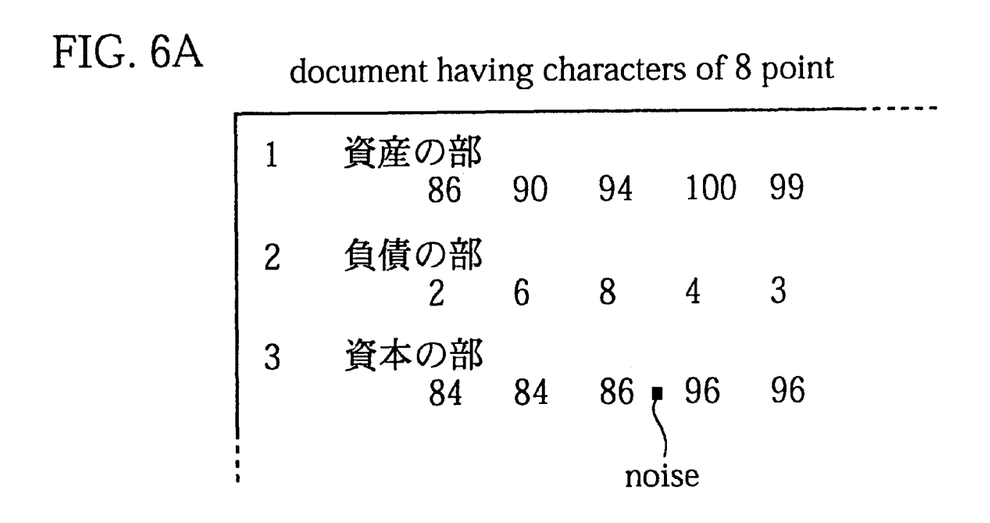
FIG. 6A shows a document having characters in 18 point and a noise.
Figure 6B:
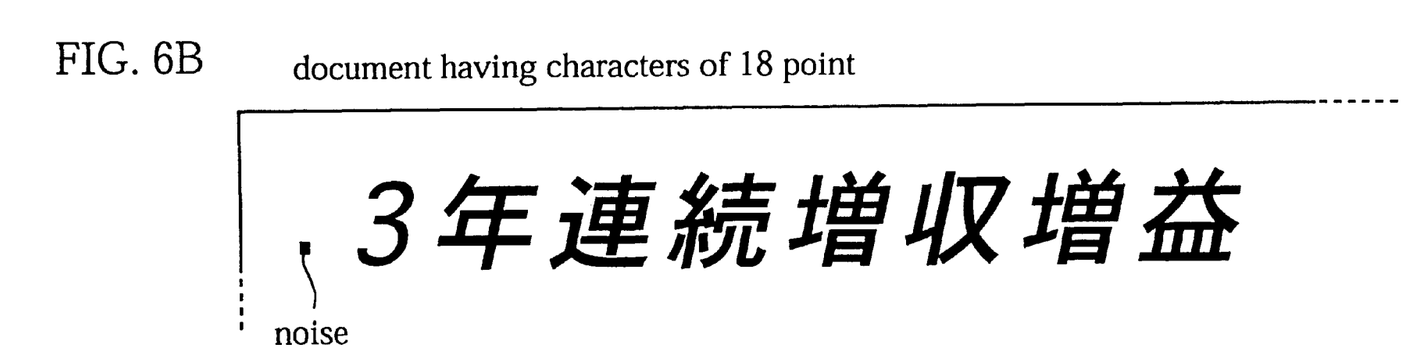
FIG. 6B shows a document having characters in 18 point and a noise that is the same size as the noise shown in FIG. 6A.

FIG. 6A shows that a noise exists in a document having characters of 8 point (the character height is about 2.8 mm). FIG. 6B shows that a noise of the same size as the noise shown in FIG. 6A exists in a document having characters of 18 point (the character size is about 6.3 mm). The size of the noise shown in FIGS. 6A and 6B is 2 mm×2 mm.

Here, suppose that the orientation detection processing of the present embodiment is performed on the document image shown in FIG. 6A. The noise elimination process 1 is performed on this document image using the filter 3×3. However, an isolated dot of this size is not eliminated by the filter 3×3 which eliminates isolated dots that are of the size of 1 mm×1 mm at the maximum. As described above, an isolated dot whose size is larger than half the character size is not judged as a noise. Therefore, in this example shown in FIG. 6A, the isolated dot may not be a noise and so is not eliminated. Note that, if the filter 3×3 should be switched to a larger filter like the filter 5×5 to eliminate this isolated dot, part of a character image would be unnecessarily eliminated. As stated, all of the noises do not need to be eliminated and it is essential only that the histograms be generated substantially from the character images.

Meanwhile, the noise elimination process 2 is performed on the document of 18 point shown in FIG. 6B. In this case, the isolated dot is judged as a noise and eliminated using the filter 5×5 which eliminates isolated dots that are of the size of 2 mm×2 mm at the maximum.

In this way, the size of an isolated dot that is to be judged as a noise is determined by the character size of the document, and the filter to be used for eliminating the noise is switched according to the character size. Thus, isolated dots are reliably eliminated or kept as they are. Consequently, as compared with a case where only one filter is used for eliminating noises, the histograms are reliably generated from the image data whose noises has been eliminated as many as possible. This enables the orientation detection processing to be correctly performed on the basis of the histograms.

The two filters are used for eliminating noises of document images in the present embodiment. However, it should be obvious that the number of filters is not limited to two. The size of a filter is set so that isolated dots to be judged as noises can be eliminated according to the character size. As such, the filter may be provided for each point size and switched according to the character size of a document. Alternatively, the noise judgement condition maybe set for each point size (can be set from 1 to 9 in the present embodiment) By doing so, noises can be eliminated more reliably.

In the present embodiment, the filters 3×3 and 5×5 are used for noise elimination to be performed on image data with low resolution (25 dpi). As to the image data with high resolution of 400 dpi, for example, the size of a pixel is reduced to about 63 μm×63 μm, so that the size of a noise to be eliminated by the filters 3×3 and 5×5 is accordingly reduced. The size of a pixel changes as the resolution changes. Also, the number of pixels forming an isolated dot to be eliminated changes. More specifically, an isolated dot of the size of 1 mm×1 mm is roughly corresponds to one pixel of the image data with 25 dpi and roughly corresponds to a 16 by 16 matrix of pixels of the image data with 400 dpi. Therefore, the filter size needs to be set in consideration of the resolution of image data.

In the present embodiment, the size of an isolated dot that is judged as a noise is about ¼ of the character size of a document. It should be obvious that the size is not limited to this and may be about ⅙ or ⅓ of the character size. However, the precision in noise elimination is deteriorated if the size is too small, and part of a character image is unnecessarily eliminated if the size is too large. As such, it is desired that the size of an isolated dot to be judged as a noise is set at an appropriate size in accordance with experimental results.

Histogram Inverse Process

In magazines and the like, characters may be printed in white on a relatively dark background. Hereinafter, such documents are referred to as "inverse documents". When the orientation of an inverse document image is detected, the precision in detection may be deteriorated. A specific explanation is given, taking a document D2 shown in FIG. 7B as one example. The document D2 is an inverse document of the document D1 shown in FIG. 7A. That is, the document is inverted from black-on-white (the document D1) to white-on-black (the document D2).

Figure 7B:
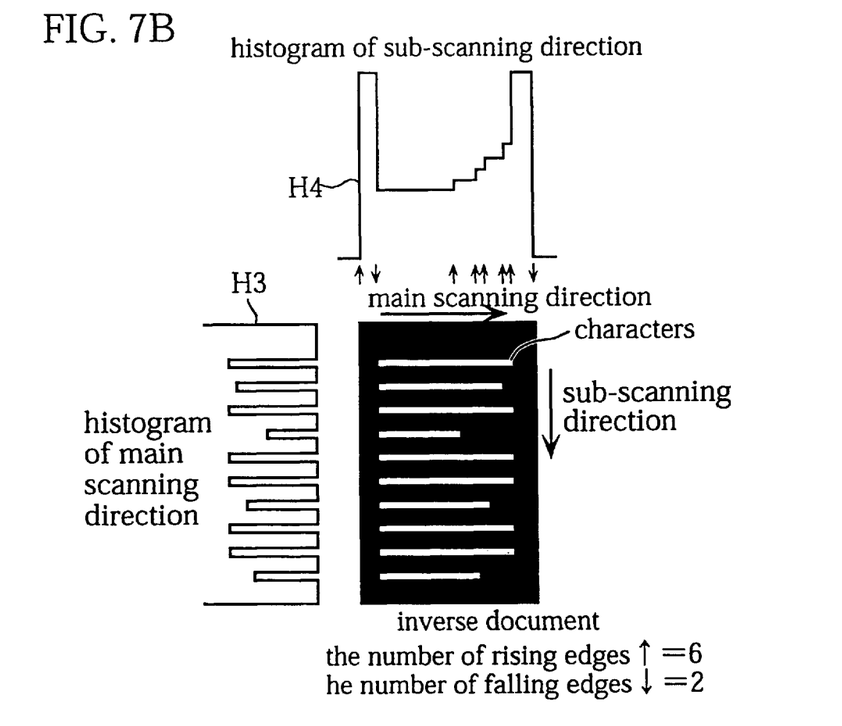
FIG. 7B shows an example of a histogram generated from image data of an inverse document.

Histograms H3 and H4 shown in FIG. 7B are generated from the image data of the document D2 in the main scanning and sub-scanning directions.

As in the case of the histogram H2 of the document D1, the numbers of rising edges and falling edges in the histogram H4 of the sub-scanning direction are counted in the counting direction, i.e. from left to right. The number of rising edges is six and the number of falling edges is two, meaning that the number of rising edges is greater than the number of falling edges. Thus, the histogram H4 is judged to display the distribution where the frequencies are gradually increasing from left to right. As a result, the beginning of lines of the document D2 is judged to be on the right (as the document D2 is viewed in FIG. 7B). However, this result is opposite to the result obtained from the document D1, and is wrong.

To address this problem, histograms of an inverse document are inverted in the present embodiment. The process for doing so is performed as follows.

The maximum frequency of the target histogram is obtained. This maximum frequency is referred to as "Dmax" hereinafter. Then, every frequency of a new histogram is calculated according to Equation 1 shown below. From the calculated frequencies, the new histogram is generated.

(frequency before the histogram is inverted)+(frequency after the histogram is inverted)=Dmax . Equation 1

That is to say, a complement on each frequency of the target histogram is calculated with respect to the Dmax as the frequency of the new histogram. Specifically, the compliment can be obtained by subtracting the current frequency from the Dmax.

The histograms H3 and H4 are inverted in this way, so that they become the same as the histograms H1 and H2. Consequently, the orientation detection processing is reliably and correctly performed on the basis of the inverse histograms.

For an inverse document, histograms generated from the inverse document image are inverted and the orientation detection processing is performed on the basis of the inverse histograms. As a result, the precision in orientation detection is improved.

It is judged whether a document that is a target of the orientation detection is inverse by comparing the average density of the document with a standard density. Here, the average density is the ratio of black pixels to the total number of pixels in the document. In the inverse document D2 shown in FIG. 7B, the ratio of black pixels are considerably great as compared with the document D1 shown in FIG. 7A. As such, the average density of the document D2 is extremely high and so exceeds the standard density. Thus, the document D2 is judged as an inverse document. The standard density is set from empirical facts and, in general, it is set at 40% to 50% since the average density of typical documents is usually obtained as about 10% to 15%. By setting the standard density at 40% to 50%, it is reliably judged whether documents are inverse.

In the present embodiment, the average density can be obtained in the following way. The frequencies of the histogram H1 or H2 having generated in step 3 of the flowchart shown in FIG. 4 are totaled, so that the total number of black pixels in the document are obtained. From the obtained total number of black pixels, the average density can be calculated.

3. Modifications

The present invention has been described in accordance with the stated embodiment. It should be obvious that the present invention is not limited to the stated embodiment, so that the following modifications can be made.

3-1

Figure 8:
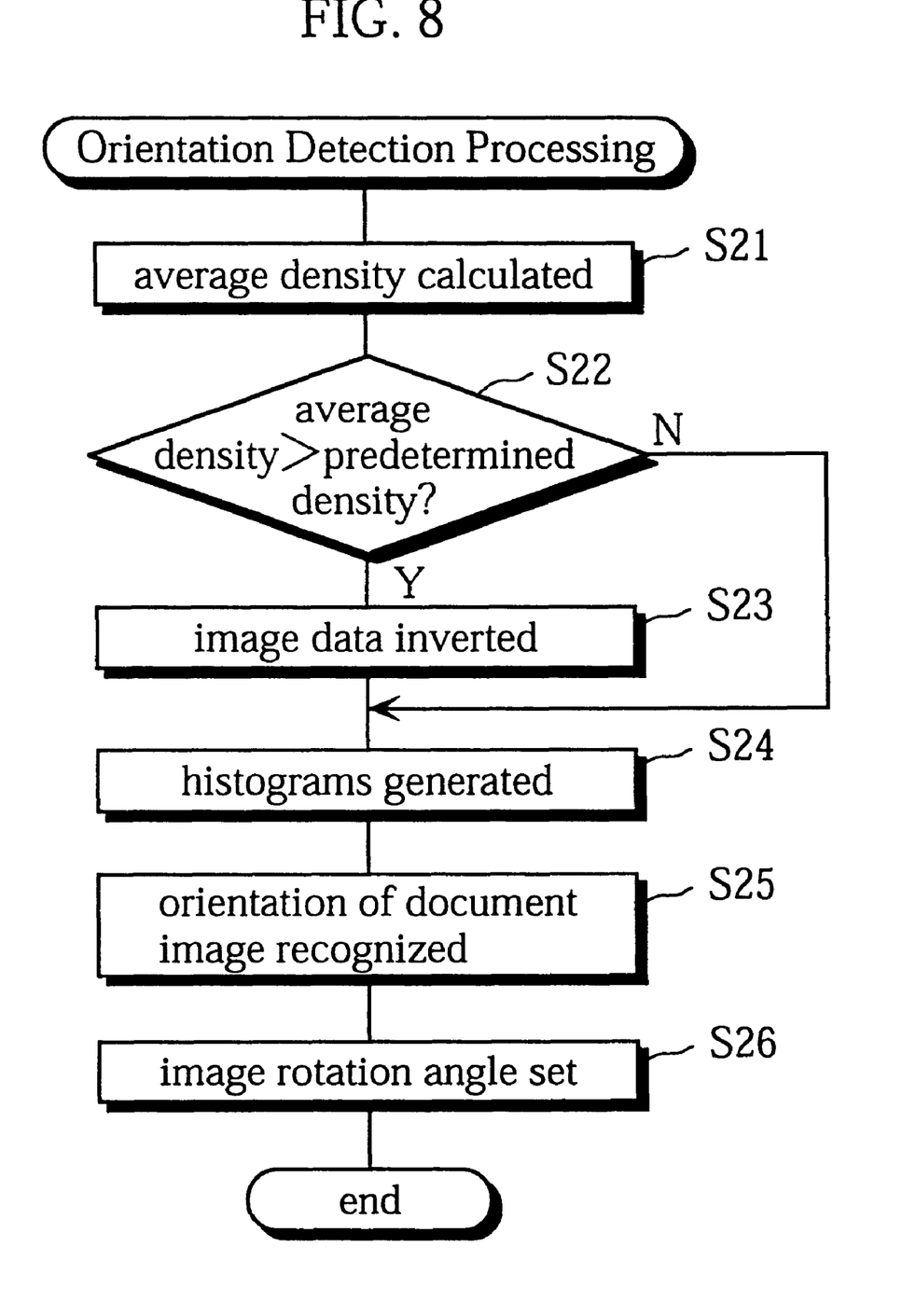
FIG. 8 is a flowchart showing the orientation detection processing performed in a modification of the embodiment.

In the stated embodiment, when a document that is a target of the orientation detection is an inverse document, histograms of the document are inverted. However, the image data of the inverse document may be inverted and histograms may be generated from the inverse image data. Then, the orientation detection processing may be performed on, the basis of these histograms. FIG. 8 shows the flowchart of the orientation detection processing in this case. Note that the processes for eliminating noises are emitted in this flowchart.

The CPU 190 calculates the average density of the image data associated with a target page that is stored in the low resolution image memory 180 (step S21). In doing so, the CPU 190 counts the number of black pixels in the page and divides the counted number of black pixels by the total number of pixels in the page. As a result, the average density is obtained.

Following this, the CPU 190 judges whether the average density exceeds the standard density (step S22). If so ("Y" in step S22), the CPU 190 has the density of the image data inverted and stores it into the RAM 191. Inverting the density refers to changing each gradation value of pixels of the image data. Specifically, each gradation value of pixels is changed according to Equation 2 shown below. Here, the maximum value as the gradation value is referred to as the "Kmax" (Kmax=255 in the present example).

(gradation value before the density is inverted)+(gradation value after the density is inverted)=Kmax . Equation 2

That is to say, a complement on each gradation value of the pixels of the image data is calculated with respect to the Kmax as the gradation value of the inverse image data. The compliment can-be obtained by subtracting the current gradation value from the Kmax.

It should be noted that, in the present example, each gradation value of the image data stored in the low resolution image memory 180 is "0" (white) or "255" (black). Therefore, the image data is converted simply by changing black pixels to white pixels and vice versa.

When judging that the average density is equal to or lower than the standard density ("N" in step S22), the CPU 190 skips step S23 and proceeds to step S24.

The processes performed in steps S24 to S26 are the same as those performed in steps S3 (or S11), S14, and 15. Thus, the explanation for these processes is omitted here.

In this modification, when a document is not an inverse document as shown in FIG. 7A, histograms are generated from the stored image data of the document. Meanwhile, when a document is an inverse document as shown in FIG. 7B, histograms are generated from the inverse image data of the document. Consequently, the same effect can be achieved in this modification as in the case where the histograms are inverted.

3-2

In the above modification, when a document that is a target of the orientation detection is an inverse document, image data of the document is inverted in the image processing apparatus that recognizes the orientation of documents in the basis of corresponding histograms. However, the image data may be inverted by the image processing apparatus that recognizes the orientation of documents according to other methods.

As one example, a so-called "pattern matching method" is disclosed in Japanese Laid-Open Patent Applications No. H04-229763 and No. H06-103410.

The pattern matching method is explained in detail. A plurality of points (referred to as "reference points") in line segments forming a character are stored as a pattern beforehand. The pattern formed from the plurality of points is stored beforehand for each predetermined reference character. A character image is retrieved from the image data having been obtained through reading a document image, and is overlaid on the pattern of the corresponding reference character for comparison. Then, a matching level is obtained every time the retrieved character image is rotated a 90° angle. For doing so, it is judged whether an image signal of the character image exists on each reference point. In accordance with the rotation angle at which the matching level is the highest, the orientation of the document image is recognized.

Figure 9A:
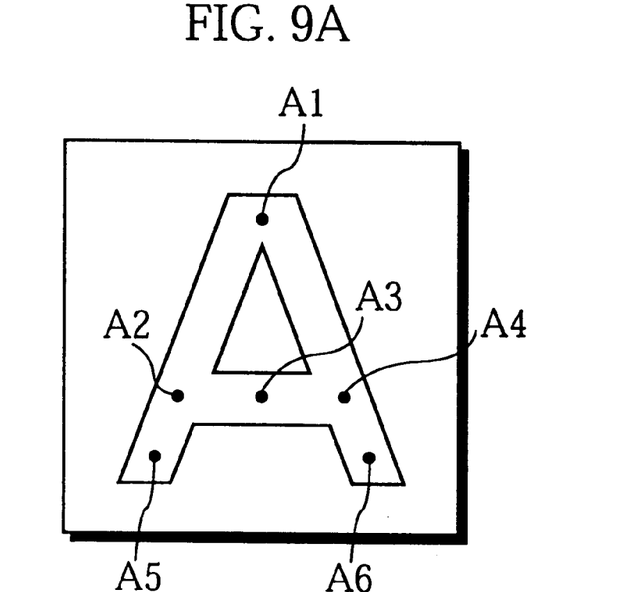
FIGS. 9A and 9B show drawings to help explain orientation detection performed according to a so-called "pattern matching method."
Figure 9B:
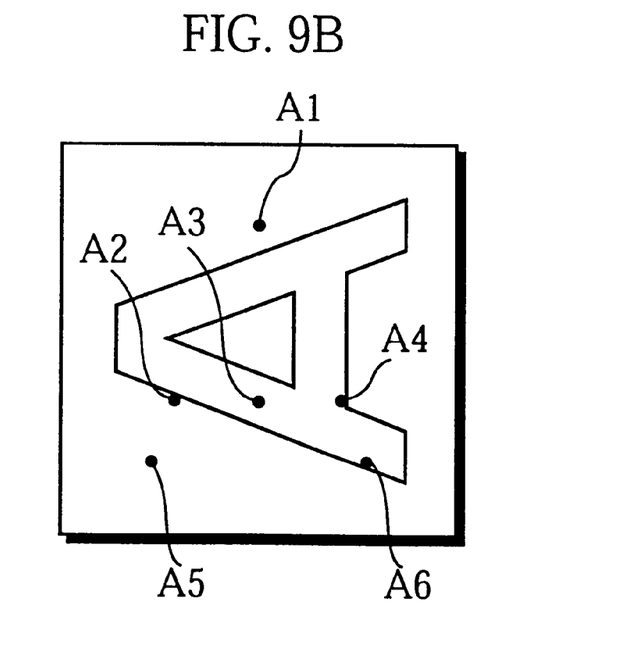

FIGS. 9A and 9B show drawings to help explain the orientation detection performed according to the pattern matching method. As shown in FIG. 9A, six reference points A1 to A6 of a reference character "A" are stored beforehand. Suppose that the retrieved character is horizontally oriented as shown in FIG. 9B. In this case, image signals do not exist on the reference points A1, A2, and A5 and, therefore, the matching level is low. The pattern matching is performed every time the retrieved character is rotated a 90° angle. Accordingly, the orientation of the retrieved character image is recognized in accordance with the rotation angle at which the matching level is the highest.

Using this conventional method, however, the orientation of a document image cannot be recognized, such as when a document is an inverse document. This is because image signals of a character image retrieved from the inverse document image do not exist on reference points whatever angle the retrieved character image is rotated.

In this case, the pattern patching may be performed after the image data of the inverse document is inverted. By doing so, the orientation of the inverse document image may be recognized.

Thus, the image data of the inverse document may be inverted in the image processing apparatus that recognizes the orientation of document images according to the pattern matching method only when the orientation cannot be detected. As a result, the orientation of the inverse document image can be recognized in accordance with the inverted document image.

3-3

In the stated embodiment, the error diffusion method is employed as the pseudo halftone reproducing method. However, other methods may be used as the pseudo halftone reproducing method. As one example, a dithering method may be employed.

3-4

In the stated embodiment, the present invention has been described as the image processing apparatus provided in monochrome digital copiers, although this image processing apparatus of the present invention can be provided in full color digital copiers. In this case, it is desirable for the copier to include a circuit for previously deleting chromatic image data from image data obtained by reading a document image and to perform the orientation detection processing using monochromatic image data only. This is because characters of full-color documents are usually monochrome. Histograms are generated from the image data of monochrome characters so that the orientation of the document is recognized. It should be noted here that the circuit for deleting chromatic image data is realized by the well-known technique and, therefore, the explanation is omitted in this specification.

3-5

In the stated embodiment, the present invention has been described as the image processing apparatus provided in digital copiers, although this image processing apparatus of the present invention may be provided for other kinds of apparatuses that read document images, such as facsimiles and image readers.

3-6

In the stated embodiment, the halftone processing unit 120 binarizes image data according to the error diffusion method. However, the halftone processing unit 120 may employ another pseudo halftone reproducing method, such as the dithering method. Also, conversion of the image data is not limited to binarization, and the image data may be ternarized. In this case, the simple binarization processing unit 170 is replaced by a simple ternarization processing unit which compares each data value of pixels of a document image with two thresholds separately. Alternatively, each data value of pixels may be converted into one of limited gradation values, with the number of limited gradation values being N more than three. Specifically, each data value may be converted into one of N-level of values. In this case, the simple binarization processing unit 170 is replaced by a simple N-value processing unit.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. An image processing apparatus comprising:
   a pseudo gradation processing unit which performs a pseudo gradation process on image data of a document image according to a pseudo halftone reproduction method;
   an N-value processing unit which generates N-value image data (N≧2) using the image data of the document image; wherein the N-value processing unit is different from said pseudo gradation processing unit; and
   a recognition controller which recognizes an orientation of the document image using the N-value image data generated by the N-value processing unit.

2. The image processing apparatus of claim 1,
   wherein the N-value processing unit performs a simple binarization process on the image data using a first threshold.

3. The image processing apparatus of claim 2,
   wherein the pseudo gradation processing unit performs the pseudo gradation process to binarize the image data using a second threshold,
   wherein the first threshold used by the N-value processing unit is set higher than the second threshold used by the pseudo gradation processing unit.

4. The image processing apparatus of claim 1,
   wherein the pseudo gradation processing unit binarizes the image data according to an error diffusion method.

5. The image processing apparatus of claim 1 further comprising
   a rotating unit which rotates the document image that has been subjected to the pseudo gradation process, in accordance with the recognized orientation.

6. The image processing apparatus of claim 1 further comprising
   a resolution converting unit which performs a resolution conversion on the image data,
   wherein the N-value processing unit converts each pixel value of the image data into one of predetermined values to generate the N-value image data after the resolution conversion on the image data, each of the predetermined values corresponding to a different one of N-level of values.

7. The image processing unit of claim 1,
   wherein the recognition controller prepares a histogram for a predetermined direction of the document image from the N-value image data, and recognizes the orientation of the document image from the histogram.

8. The image processing apparatus of claim 7,
   wherein the recognition controller inverts data in the histograms to recognize the orientation of the document image when an average density of the document image exceeds a predetermined density.

9. The image processing apparatus of claim 1,
   wherein the recognition controller performs a poise elimination process on the N-value image data before recognizing the orientation of the document image by the N-value image data.

10. The image processing apparatus of claim 9,
    wherein the recognition controller uses a filter in the noise elimination process performed on the N-value image data, with a size of the filter being changed according to a size of characters in the document image.

11. The image processing apparatus of claim 1,
    wherein the recognition controller retrieves a character image from the N-value image data, and compares the character image with a reference pattern to recognize the orientation of the document image.

12. An image forming apparatus comprising:
    a receiving unit which receives image data of a document image;
    a pseudo gradation processing unit which performs a pseudo gradation process on the image data received by the receiving unit according to a pseudo halftone reproduction method;
    an image forming unit which reproduces the document image using the image data that has been subjected to the pseudo gradation process;
    an N-value processing unit which converts the image data received by the receiving unit into N-value image data (N≧2) expressed by N-level of values; wherein the N-value processing unit is different from said pseudo gradation processing unit; and
    a recognition controller which recognizes an orientation of the document image using the N-value image data converted by the N-value processing unit.

13. The image forming apparatus of claim 12 further comprising a rotating unit which rotates the document image that has been subjected to the pseudo gradation process, in accordance with the recognized orientation, wherein the image forming unit reproduces the document image rotated by the rotating unit.

14. The image forming apparatus of claim 12, wherein the N-value processing unit performs a simple binarization process on the image data using a first threshold.

15. The image forming apparatus of claim 14, wherein the pseudo gradation processing unit performs the pseudo gradation process to binarize the image data using a second threshold, wherein the first threshold used by the N-value processing unit is set higher than the second threshold used by the pseudo gradation processing unit.

16. An image processing apparatus comprising:

a receiving unit which receives image data of a document image;

a first binarizing circuit which binarizes the image data received by the receiving unit to generate first binarized image data, according to a first method;

an image processing circuit which performs an image process on the first binarized image data;

a second binarizing circuit which binarizes the image data received by the receiving unit to generate second binarized image data, according to a second method that is different from the first method; and a recognition controller which recognizes an orientation of the document image using the second binarized image data.

17. An image processing apparatus comprising:

a receiving unit which receives image data of a document image;

a first binarizing circuit which binarizes the image data received by the receiving unit to generate first binarized image data, according to a first method;

an image processing circuit which performs an image process on the first binarized image data;

a second binarizing circuit which binarizes the reduced resolution image data to generate second binarized image data, according to a second method that is different from the first method; and a recognition controller which recognizes an orientation of the document image using the second binarized image data, wherein the first binarizing circuit binarizes the image data using a first threshold representing a density level and the second binarizing circuit binarizes the image data using a second threshold representing another density level, with the second threshold being set higher than the first threshold.

18. The image processing apparatus of claim 16, wherein the image process of the image processing circuit is achieved by rotating the document image, and the image processing circuit rotates the document image that has been subjected to the binarization by the first binarizing circuit, in accordance with the recognized orientation.

* * * * *